(12) United States Patent
Choi et al.

(10) Patent No.: US 11,967,689 B2
(45) Date of Patent: Apr. 23, 2024

(54) SMART BATTERY PACK

(71) Applicant: Mobius.Energy Corporation, Tustin, CA (US)

(72) Inventors: Eugene Choi, Tustin, CA (US); Daniel Membreno, Tustin, CA (US)

(73) Assignee: Mobius.Energy Corporation, Tustin, CA (US)

( * ) Notice: Subject to any disclaimer, the term of this patent is extended or adjusted under 35 U.S.C. 154(b) by 191 days.

(21) Appl. No.: 17/293,033

(22) PCT Filed: Nov. 12, 2019

(86) PCT No.: PCT/US2019/060987
§ 371 (c)(1),
(2) Date: May 11, 2021

(87) PCT Pub. No.: WO2020/102235
PCT Pub. Date: May 22, 2020

(65) Prior Publication Data
US 2021/0399357 A1    Dec. 23, 2021

Related U.S. Application Data

(60) Provisional application No. 62/758,855, filed on Nov. 12, 2018.

(51) Int. Cl.
*H01M 10/637* (2014.01)
*H01M 10/613* (2014.01)
*H01M 10/643* (2014.01)
*H01M 10/6557* (2014.01)
*H01M 10/6572* (2014.01)
(Continued)

(52) U.S. Cl.
CPC ....... *H01M 10/637* (2015.04); *H01M 10/613* (2015.04); *H01M 10/643* (2015.04); *H01M 10/6557* (2015.04); *H01M 10/6572* (2015.04); *H01M 50/583* (2021.01); *H01M 50/107* (2021.01); *H01M 2220/20* (2013.01)

(58) Field of Classification Search
CPC ............. H01M 10/637; H01M 10/613; H01M 10/643; H01M 10/6557; H01M 10/6572; H01M 50/583
See application file for complete search history.

(56) References Cited

U.S. PATENT DOCUMENTS

| | | |
|---|---|---|
| 2003/0017383 A1 | 1/2003 | Ura et al. |
| 2008/0305388 A1 | 12/2008 | Haussman |
| 2011/0163701 A1 | 7/2011 | Carrier et al. |

(Continued)

FOREIGN PATENT DOCUMENTS

WO    WO2012069417 A1    5/2012

*Primary Examiner* — Karie O'Neill Apicella
(74) *Attorney, Agent, or Firm* — DLA Piper LLP (US)

(57) ABSTRACT

Systems and methods here may include a modular battery pack including a housing, and within the housing: individual battery cells arranged in rows, a circuit board at one end of the housing configured to manage a thermal condition of the battery pack, heat sensors in communication with the circuit board, an enclosed heat pipe arrangement in a corrugated configuration arranged between each row of battery cells within the housing, and a fan and/or Peltier heat sink configured at one end of the battery pack housing, in communication with the circuit board.

7 Claims, 10 Drawing Sheets

(51) Int. Cl.
   *H01M 50/107*   (2021.01)
   *H01M 50/583*   (2021.01)

(56) References Cited

U.S. PATENT DOCUMENTS

| | | |
|---|---|---|
| 2011/0189525 A1 | 8/2011 | Palanchon et al. |
| 2015/0129332 A1 | 5/2015 | Seto et al. |
| 2016/0172642 A1 | 6/2016 | Hughes et al. |
| 2016/0322680 A1* | 11/2016 | Merriman ........... H01M 10/613 |
| 2017/0358831 A1 | 12/2017 | Milroy et al. |

* cited by examiner

SMART BATTERY PACK

CROSS REFERENCE

This application is a national phrase of International Application No. PCT/US2019/060987 filed on Nov. 12, 2019, which relates to and claims priority from U.S. Provisional Application No. 62/758,855 filed on Nov. 12, 2018, each of which is hereby incorporated by reference in their entirety.

TECHNICAL FIELD

This application relates to the field of batteries, thermal management, power storage and usage, and various combinations of these and other aspects of power management.

BACKGROUND

There has been a continuous progress toward the full electrification of society. The internal combustion engine has been instrumental to the development of modern society but it has always been a compromise technology. In the early days of cars, electric and petrol options competed side by side. Electric cars were distinguished by their smoother ride, lack of emissions and fast acceleration. However, electric cars of the era could not compete on the most important factor to transportation, that of range. Over time, the internal combustion engine improved in efficiency and the range of petrol cars increased while electric cars remained a low range option.

With the prevalence of lithium ion batteries in the 1990's, electric transportation was once again studied. Improvements have been made to increase the energy density (energy divided by mass or volume) of the batteries so that the effective range of vehicles can be increased. The battery still consists of a positive cathode material and a negative anode material separated by an electronically insulating, ionically conducting electrolyte. What is now new, is that the batteries may now be made of lighter materials that can pack energy more densely which results in specific energies.

Putting batteries to use in transportation requires a few additional considerations primarily considering the electric motors. Electric motors can operate on a range of voltages but the ones that have gained favor for electric vehicles typically operate in the range of 400 to 800 Volts. This voltage range is further subdivided into regions of optimal engine efficiency. Battery cells (consisting of one positive cathode and one negative anode) have a charging voltage that is typically less than 5 V and most often near 4.2 V. From the desired voltage range, it is clear that many batteries will be needed to achieve the desired voltage. In this disclosure, the word battery and cell may be used interchangeably and may refer to the singular device capable of storing electric energy.

There exists a need for batteries with thermal and electrical management systems as described herein.

SUMMARY

Systems and methods here may include a modular battery pack including a housing, and within the housing: individual battery cells arranged in interstitial or parallel rows, circuits boards on each end of the battery cells and an additional circuit board at one end of the housing configured to manage a thermal condition of the battery pack, heat sensors in communication with the circuit board, an enclosed heat pipe arrangement in thermal contact with the circuit boards and or in a corrugated configuration arranged between each row of battery cells and or on each end of the battery within the housing, and a fan/peltier heat sink configured at one end of the battery pack housing, in communication with at least one circuit board.

Some example embodiments include, alternately or additionally, a battery system, including a battery housing including walls surrounding an array of battery cells arranged in rows, a circuit board at a first end of the housing in communication with heat sensors in the housing, an enclosed corrugated heat pipe arranged between two rows of battery cells within the housing, and a Peltier heat sink configured at a second end of the battery pack housing, in communication with the circuit board. In some examples, the enclosed heat pipe arrangement is in thermal contact with fused aluminum circuit boards that press connect each of the battery cells in the row within the housing. In some examples, additionally or alternatively, a second battery system may be coupled to the first battery system by a wall of a multi-battery pack system, the wall of the multi-battery pack system in thermal contact with each of the first and second battery systems, and designed to remove heat from each. In some examples, each of the battery cells is arranged in the walls of the housing, such that a polarity for each battery is aligned in the same direction. In some examples, additionally or alternatively, each of the battery cells is arranged in the walls of the housing, such that a polarity for each battery is alternating in opposite directions, for each successive battery cell in each row. In some examples, additionally or alternatively, at least one fuse in the circuit board, the fuse configured to remove a load from the battery cells at a pre-determined voltage. In some examples, the fuse is a double fuse. In some examples, additionally or alternatively, the number of rows of battery cells is five and the number of battery cells in each row is either 8 or 9. In some examples, insulating wrapper may be configured at one end of the battery cells within the walls of the housing.

Additionally or alternatively, some examples may include a method of thermally managing a battery systems, including receiving, at a logic circuit in a first end of a battery pack system, thermal data of battery cells from heat sensors in communication with the logic circuit, determining, at the logic circuit, if the thermal data of battery cells exceeds a predetermined temperature threshold, and if the thermal data exceeds the predetermined temperature threshold, sending, by the logic circuit, commands to energize a Peltier heat sink configured at a second end of the battery pack housing. In some examples, additionally or alternatively, the heat sensors are arranged on corrugated heat sink vapor chambers configured between rows of battery cells within the battery system. In some examples, additionally or alternatively, the method includes sending, by the logic circuit, commands to energize a fan configured at the second end of the battery pack housing, if the logic circuit determines that the thermal data exceeds the predetermined threshold. In some examples, additionally or alternatively, the determining step includes data regarding the number of heat sensors of which the corresponding data exceeds the predetermined threshold. In some examples, additionally or alternatively, the battery pack system is in thermal communication with a multi-pack wall which includes multiple battery pack systems. In some examples, additionally or alternatively, the method further includes monitoring, at the logic circuit, a charge of each battery cell within the battery pack system. In some examples, additionally or alternatively, the method includes active balancing, by the logic circuit, by commanding a higher charged cell in the battery pack system to discharge into a lower charged cell in the battery pack system.

DETAILED DESCRIPTION

Figure 1:
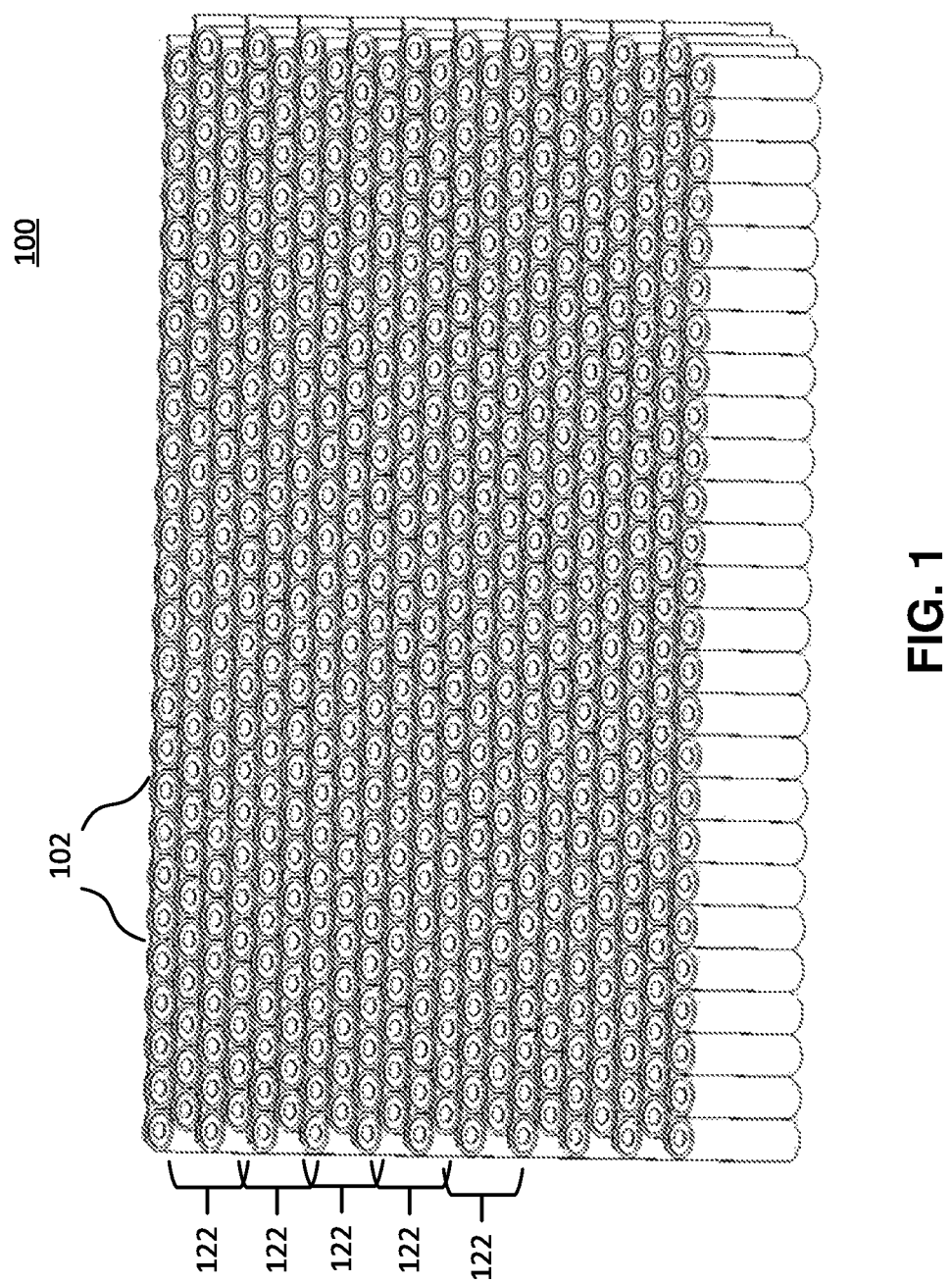
FIG. 1 is a top down depiction showing examples of battery cell embodiments disclosed herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

Systems and methods here provide for integrated battery pack systems with their own individualized thermal management and electrical management systems. In some examples, these battery packs are arranged and configured to be modular packs with component parts to allow swapping, maintenance, and/or component changes. The result may be better performance from the batteries within the packs, better charge efficiency for the same battery systems, in modular, maintainable and replaceable systems.

In some example embodiments, alone or in combination, these modular battery packs may include various combinations of internalized circuits which may be configured to manage electrical charging and discharging, manage thermal heat sinks integrated inside and around each battery cell, manage fan/Peltier heat sink systems. In some example embodiments, these systems are all enclosed within a pack that itself can be removed, swapped, replaced, as well as opened for individual component maintenance and/or upgrade.

Battery Configuration Examples

Basic physics describes the solution to increasing the voltage of the batteries, place them in series. Series is a configuration where two battery cells are placed with the positive terminal of one cell in direct contact with the negative terminal of the other cell. When making connection to the unattached terminals, the voltage will be equal to the sum of the individual cells. A collection of battery cells with cells in series may be referred to as a battery pack.

Once enough cells have been placed in series to create the desired voltage, there is still the matter of keeping the electric engine running for the length of the drive. This may be achieved by adding batteries in parallel. Parallel connections add batteries of like terminals together then commonly referred to as strings or rows. For example, two battery cells placed with their positive terminals connected as well as their negative terminals connected would be in parallel. A voltage measurement across the two cells would show their common voltage, and the capacity of energy stored in both cells would be accessible. We can now expand the battery pack to include a group of cells with parallel and series connections.

Battery systems have had problems with maintenance, historically. Since batteries may be short lived compared to other electronic components, some systems may be built with battery access in mind. There are still some practices of hard wiring batteries via soldering or spot welding that are not conducive to maintenance as the entire system can only be replaced.

For small systems such as backup power for computers or for residential units, a singular battery pack which typically has total stored energy in the range of 1 to 10 kWh, could function as the sole energy storage unit. For larger systems, with energies greater than 10 kWh, it is more common that a collection of battery packs may be grouped into a larger battery system. This system may then have series and parallel connections between battery packs to deliver the desired voltage for the application.

The individual batteries may have specified charging voltages but no two cells are exactly alike in energy storage capacity. This means that when a battery pack is charged (energy entering the pack for storage) the voltage of the pack may rise unevenly. Unevenly in that some of the strings of cells may be approaching their maximum charging voltage while other strings are significantly further from their maximum charging voltage. There may be battery monitoring circuits that monitor voltage and act to alleviate these differences in capacity through a process known as balancing.

Moving charge around is not a perfectly efficient process, as there will be heat generated due to ohmic resistance. What this means is, that each wire, battery, and electrical component will have a resistance associated with it that is typically measured in ohms. Current is measured in amperes. The equation for waste heat is proportional to the resistance multiplied by the square of the current and is described in watts. From the equation, increasing the rate of charging, increases the current and greatly increases the rate of heat produced.

Thermal management is the next layer to consider in the battery system. Thermal management comprises the parts of the system that pull the heat away from the batteries. For improved longevity, batteries should operate within 5° C. of 25° C., but during fast charging and discharging the temperature of the batteries can rise greatly. In some cases battery failures may occur when the cells are in continuous operation above 50° C. or momentarily exposed to temperature above 60° C. When battery temperature rises above 30°

C., the battery lifetime may be diminished with increasing temperature. If battery temperatures exceed 120° C. then additional safety considerations may occur where the battery will self-heat in a process known as thermal runaway. Thermal runaway is a failure mode where a single battery cell can ignite and cause adjacent cells to also ignite. This catastrophic failure mode typically ends in the entire battery pack igniting. This danger underscores the importance of a strong thermal management system.

Historically, thermal management has been performed for larger systems by either air cooling or liquid cooling the batteries. Air cooling requires the batteries to be spaced far apart so that a fan can circulate the air between and among cells. This cooling may be useful for low power systems that have little heat to dissipate. Liquid cooling may have more cooling capability and may be comprised of a flexible plastic line filled with liquid that runs past the batteries and terminates at a radiator or chiller. At the radiator, cool air may be blown onto the plastic line to remove the excess heat from the liquid. At the chiller, refrigeration may be achieved and the refrigerant liquid may be cooled similar to the operation for a commercial refrigerator.

The effectiveness of thermal management may be measured by the maximum battery temperature that the batteries are subjected to and the amount of energy consumed in the cooling process. To cool effectively, the heat needs to be rapidly moved away from the battery cells which can be accomplished by increasing the contact area between the cells and the coolant. The coolant may also move heat quickly which can be achieved with high thermal conductivity. Heat capacity may be considered since it is the amount of heat that a material can absorb before increasing in temperature.

For liquid cooled systems, it may be difficult to balance these considerations in overall thermal management. The liquid filled lines may be wrapped around the battery strings but this may only allow one side of a string to be in contact with the cooling line. The liquid coolant when heated may be wrapped around the system, thereby pushing heat back into the portions that are supposed to be cooled. The liquid refrigerant may be a mixture of ethylene glycol and water. This fluid has a low thermal conductivity but a relatively high heat capacity. This combination of properties may utilize a pump to circulate the cooling liquid at a rapid pace for increased cooling. If the pump were to fail, the operation of the entire system would be hampered and secondary safety systems would be needed to prevent the batteries from overheating. This may be accomplished by the battery management system limiting the discharge current of the cells.

As part of the secondary safety systems, fusing may be used to isolate individual cells from disrupting the entire battery system. Such a fuse is analogous to the fuses used in homes with the appropriate engineering consideration for being used with batteries, namely fast blow times and correctly sized for the high currents of a battery pack. There are two failure modes possible for a battery cell, a short and an open. A short may be the more problematic condition, in this condition the battery is rapidly discharging due to an internal connection in the battery cell. This internal condition can be the result of metal shavings left over from manufacturing, or by degradation of the cell edges over time. Or in an extreme case, puncture of the battery wall by a conductive material. When a battery enters the short condition, it discharges rapidly so a lot of heat is generated within the battery. Since each cell is part of a string, adjacent cells will also discharge their energy through the shorted cell. Fusing is used to prevent this single cell from discharging the entire battery system catastrophically.

Fuses are all similar in function, they are designed to open when a specified amount of current or voltage is applied. The fuses for battery cells are typically set at twice the maximum charging current, and may put the cell into an open condition if the specified amount of current begins to flow from the cell. An open condition is when the cell is removed from the electrical circuit usually from a wire physically breaking hence the name open. Open cells do not pose a particular safety hazard but they do reduce the systems maximum stored energy. Open cells create more work for the battery management system, since it they will reduce the energy available to a discreet battery string and thusly unbalance the system when charging and discharging. The systems and methods here are engineered to meet these needs.

Battery Pack Configuration Examples

In some examples, as shown in FIG. 1, battery pack configurations may be utilized as described above. For example, the battery pack 100 example may include any number of individualized battery cells 102 shown in the figure from the top perspective. Each battery cell 102 may be a system like a typically configured "2" or "2A" battery, and/or cylindrical cells in the 18650 or 21700 form factor, so named for its 21 mm diameter and 70 mm length, with a positive terminal at one end and a negative terminal at the opposite end, in a rolled tube or cylinder. Any of various other shapes, types, or examples of batteries could be used in combination with these other component parts described herein, but the example as shown in FIG. 1 as cylindrical battery cells 102 is merely an example and not intended to be limiting. These battery cells 102 could be lithium-ion, alkali ion, alkali earth ion, supercapacitor, or any kind of battery cell. For the context of the patents the batteries are assumed to be rechargeable, but this technology also extends to primary, single use type batteries.

Further, such battery arrangements may take many forms. For example, as shown in FIG. 1, five strings 122 of twenty-five battery cells 102 may be arranged in series in an overall battery pack 100. The length of the string 122 can be increased or decreased per the application from any number such as two to any other number such as but not limited to one hundred cells. In some examples the strings 122 are between ten and seventy-five battery cells. Some other examples include strings 122 in series per battery pack 100 between two to fifty. In some examples, the strings 122 in a battery pack 100 are between eight and twenty. Similarly, the number of strings 122 could be any number including but not limited to five as shown in FIG. 1. In some examples, the strings 122 of battery cells 102 could be four, three, two, one, six, seven, eight, nine, and/or ten. Any number of strings 122 could be arranged into a modular battery pack 100 as shown.

Figure 2:
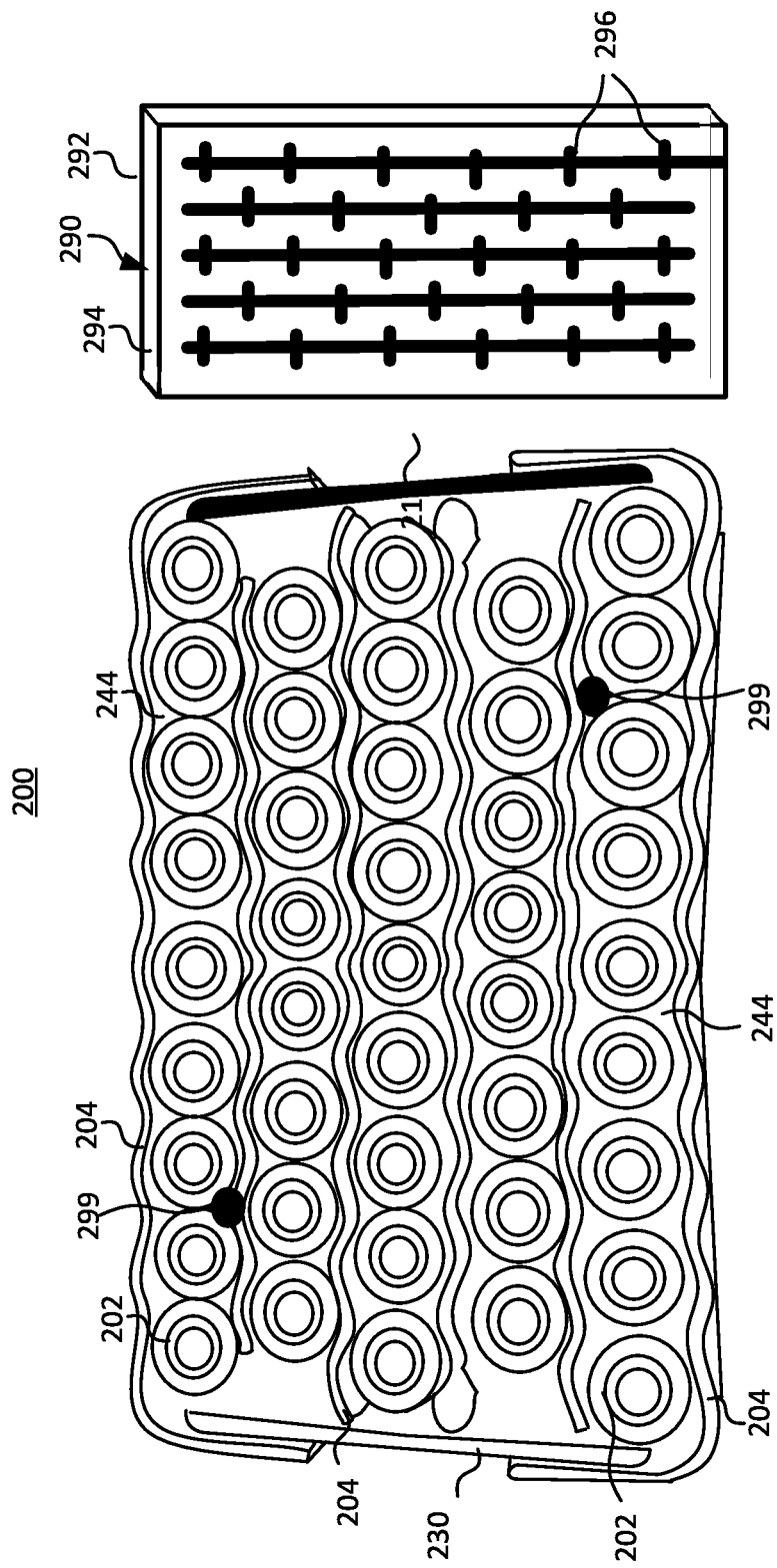
FIG. 2 is a top down depiction showing examples of embodiments disclosed herein.
Figure 4:
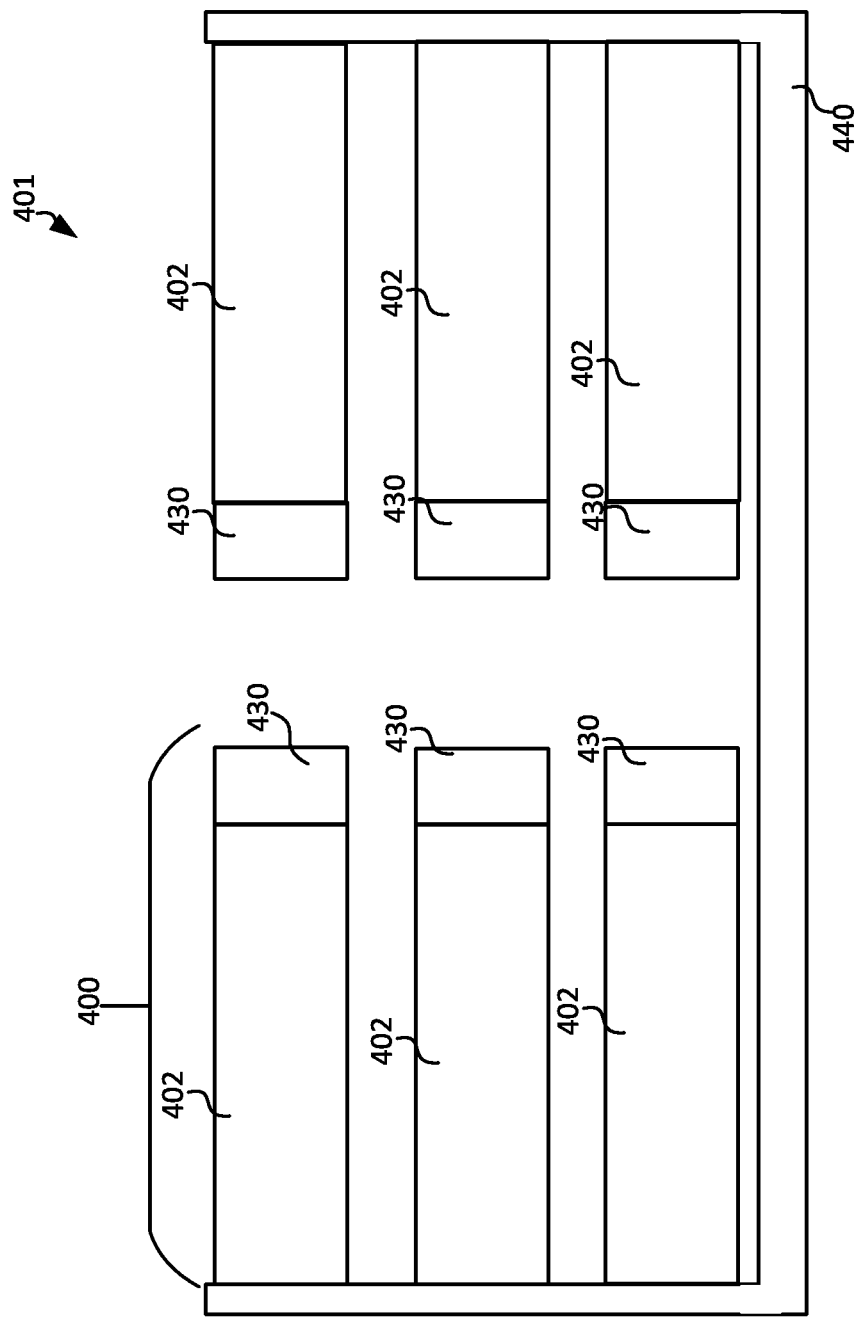
FIG. 4 is an example schematic diagram showing examples of embodiments disclosed herein.

Such battery packs 100 may include other components such as thermal management components as described in FIG. 2 and FIG. 4. The examples shown in FIG. 2 and FIG. 4 show modular battery packs that may include various combinations of thermal management systems and internalized circuits which may be configured to manage electrical charging and discharging, manage thermal heat sinks integrated inside and around each battery cell, and/or manage fan/Peltier heat sink systems. In some example embodiments, these systems may all be enclosed within a pack that itself can be removed, swapped, replaced, as well as opened for individual component maintenance and/or upgrade in a modular fashion.

In the example of FIG. 2 a top down view of the battery pack 200 with thermal management components is shown. As described in FIG. 1, any number of battery cells 202 may be placed in close proximity with one another, and as cylindrical tubes, able to be stacked, bunched, and/or otherwise grouped in a number that makes sense for the application it is intended to power. As described, the battery cells 202 could be arranged in parallel and/or series, to obtain the voltage and overall power desired for a particular application.

In the example of FIG. 2 the battery cells 202 are grouped together in an overall pack 200 such that they are aligned in rows. To minimize the space required in the example, the cells 202 in each row are shifted one-half cell as compared to the next row, so that the cells 202 may fit closer together, between the next cells, owing to their circular cross sectional shape making peaks and valleys, the peaks of one row resting in the valleys of the next.

As the arrangement of the cells 202 is in rows, and alternating columns, a thermal management layer 204 may be configured between each row to draw heat from the cells 202. In some examples, the thermal layer 204 may be configured in a wavy shape to accommodate the tubular or cylindrical shape of the cells 202 and thereby increase or maximize the amount of surface area contact with the cells 202. In such examples, this layer 204 may separate the rows of battery cells 202 but in other examples, the thermal management layer 204 could separate columns of cells 202 instead. In some examples the thermal management layer 204 may separate both rows and columns of cells 202 by running between and among each of the cells 202 in more of a grid fashion.

In some examples, these thermal management layers 204 may include a vapor chamber, heat sink, and/or heat pipe arrangement as described below. Such a heat sink may be arranged to draw heat from the battery cells 202 to one of the two ends of the pack 200 and/or the top or bottom of the pack as described herein, and thereby lower the temperature of the cells 202 and/or the overall system. In some examples, the walls of the battery pack system itself 200 may include or be made of heat pipe/vapor chambers for thermal management. In some examples, additional walls may surround the battery pack system 200 that are not themselves heat pipes/vapor chambers, but a material that dissipates and/or spreads heat such as but not limited to aluminum, copper, ceramics, and/or steel or a combination of these or other materials.

In some examples, any number of thermal temperature sensors 299 may be placed in, on, around, or near the battery cells 202 and/or walls 204 of the battery system 200. Such thermal sensors may be configured to sense the temperature of the surrounding air and/or systems such as the battery cells 202 and/or walls 204 and/or circuits 230. In the example shown in FIG. 2, the sensors 299 are shown near the battery cells 202 and near the internal heat pipe vapor chambers 204 but could be placed in any number and in any arrangement or place. In some examples, such thermal sensors 299 may be in communication with the circuit 230 and be configured to send temperature data to the circuit for processing as described in FIG. 9.

As shown in FIG. 2, 1, etc. in embodiments that utilize cylindrical battery cells, 200, either positive or negative electrode terminals are accessible from one end of the cell and therefore one side of the battery pack 200. In some example embodiments, the battery cells 202 may be oriented in the same direction so that the positive terminal faces the battery management circuits discussed later. In such examples, this arrangement may eliminate the need for having circuits on both sides of the battery. In some examples, another heat management system may be connected directly underneath the cells 202 with a thermal gap filler as described herein.

Figure 3:
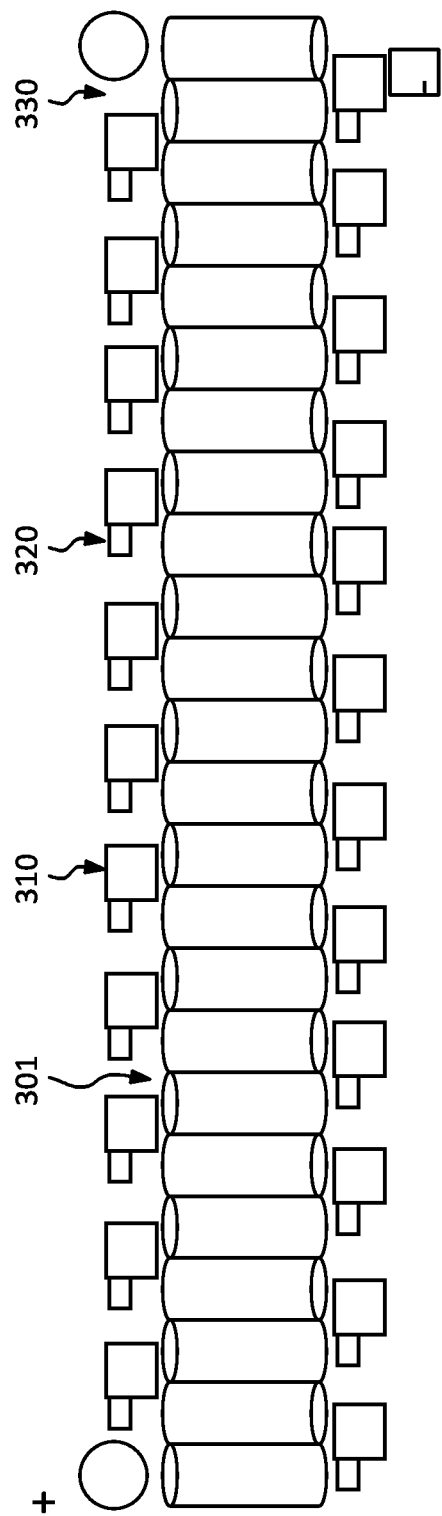
FIG. 3 is another top down depiction showing examples of battery series connections in the battery pack as embodiments disclosed herein.

An alternative orientation to FIG. 1 is FIG. 3, where the rows of battery cells are arranged such that they alternate in polarity. FIG. 3 could be embodied with circuit boards on each end of the battery cells 301, one advantage is that series connections could be more easily implemented with the cells alternating polarity. Small depictions of the battery connecting pin 310, individual fusing 302 and the overall bus bars 330 are also depicted in FIG. 3. Bus bars do not have to present throughout the module due to parallel current paths where each battery and circuit trace is responsible for carrying its own fraction of the total battery pack current typically 10 to 20 Amps. The number of series connections and bus bar positions shown in FIG. 3 are meant to be an illustration. The claims are for the concept that is depicted by the example not limited to the specific number of battery cells in series or to the placement or number of bus bars.

The bus bars located at the lowest negative terminal and highest positive reduce the overall electrical resistance of the modular battery pack especially under high current discharge. Bus bars are typically made of high electrical conductivity metals that have been treated to resist oxidation from the environment. Typically bus bars are copper or aluminum with a surface treatment usually a plating process.

Heat Pipe/Vapor Chamber Examples

Figure 5:
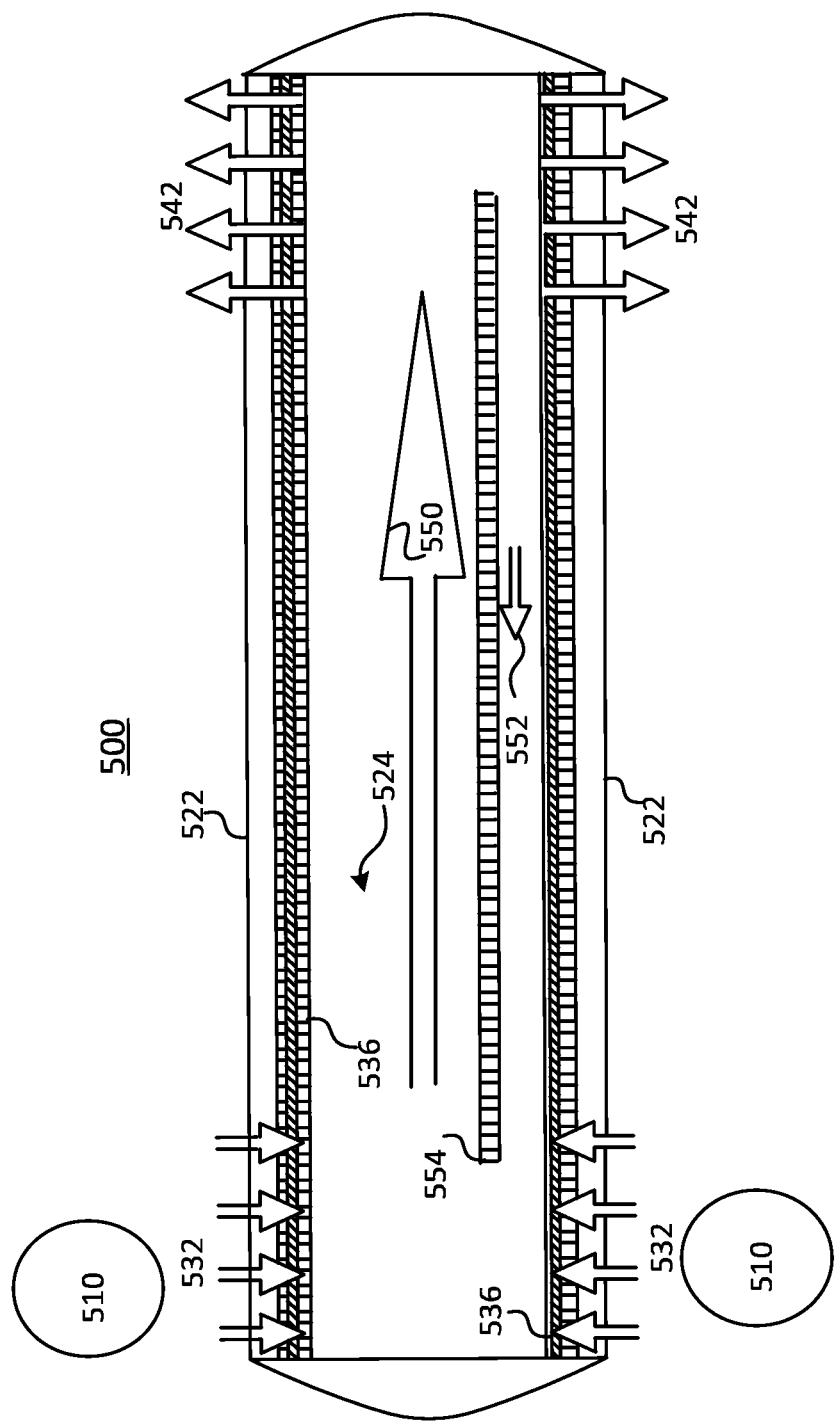
FIG. 5 is a diagram of an example heat pipe configuration used in embodiments disclosed herein.

An example of a heat pipe and/or vapor chamber thermal management layer arrangement is shown in FIG. 5. As used herein a heat pipe arrangements and/or vapor chamber arrangement may be any of various structures that include the basic features of longitudinal spaces or voids which are at least partially filled with liquid and used in heat management as described herein.

Figure 7:
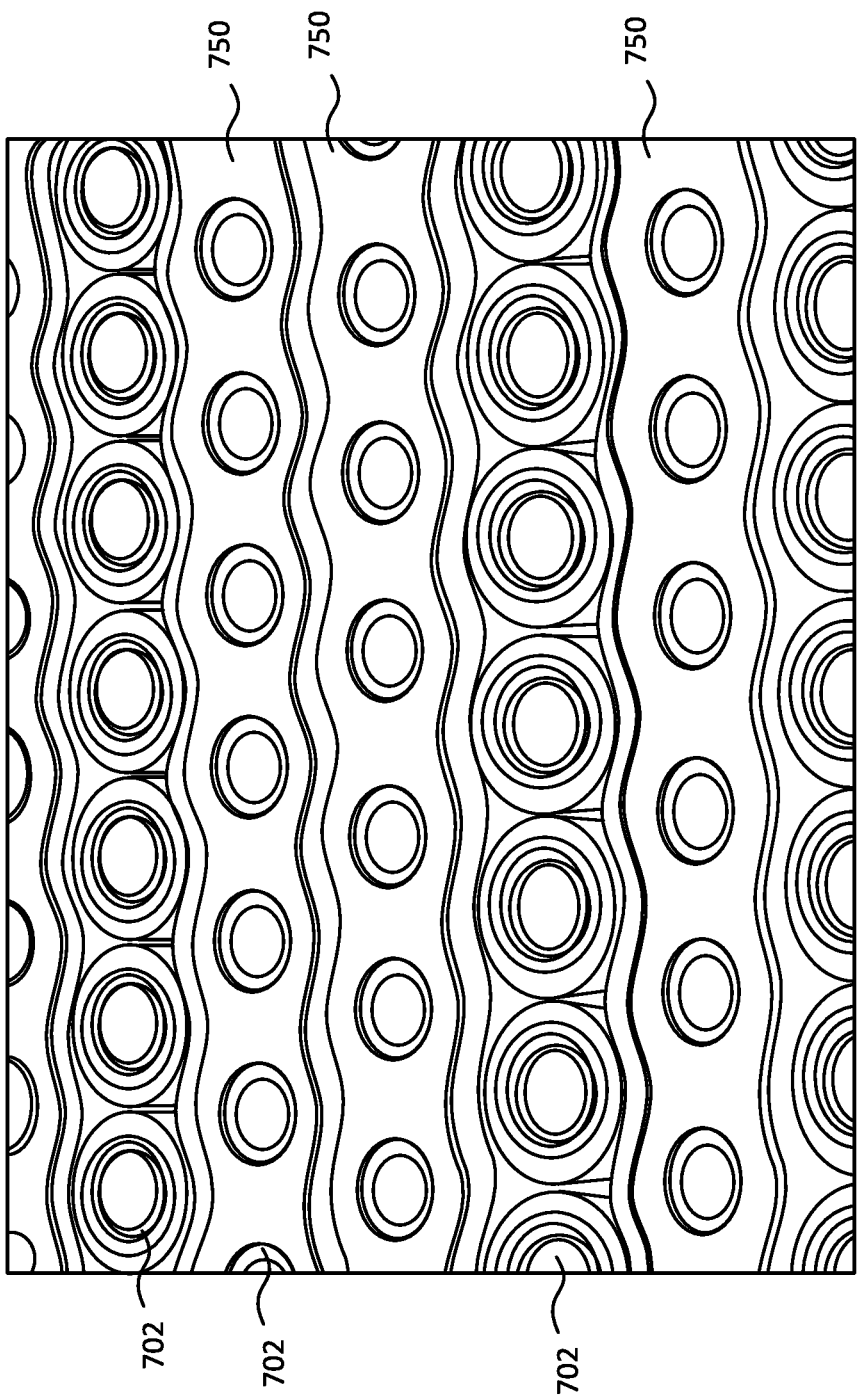
FIG. 7 is a diagram of an example battery configuration used in embodiments disclosed herein.

In FIG. 5 the internal heat pipe arrangement 500 is shown as extruded metal, for example but not limited to, aluminum, copper, steel shaped into walls 522 that include elongated open gaps, holes, or bubble spaces 524 inside the walls 522 into which a liquid and/or gas may be held. In some examples, the walled arrangement 522 may be encased in a shell or barrier (not shown) that keeps liquid inside the sealed chamber 524. This entire arrangement of the walls 522 with open elongated openings 524 and the sealed shell can itself be shaped in any of various shapes. For example, the overall shape can be corrugated with waves as shown in FIG. 2. Some examples of the heat pipe arrangement allow for twenty-five times higher thermal conductivity than aluminum alone. This allows the heat management system to move heat more efficiently away from the cells. To improve the connection between the heat management system and the cells, the heat management system may be shaped into a corrugated structure that matches the curves of the cylindrical cells. This curvature is shown in FIG. 2. This design can optionally contain an additional interface material such as thermal gap filler 244 that would be placed between the cells and the heat management system. The thermal gap filler is a material with high thermal conductivity and low electrical conductivity. Typically the gap filler is a foam or rubber with metal oxide particles or carbon to provide the thermal conductivity. The gap filler 244 may then fill in any imperfections in the cell casing and would further improve the contact between the heat management system and the cells. In FIG. 7, battery cells 702 are depicted with a plastic insulating wrapper 750. Examples of such also include FIG. 4 where individual battery units 402 each have their own internal heat pipe corrugated shaped battery cell separators as shown in FIG. 2, and then an overall multi-battery pack wall 440 which draws heat from the individual units 400. In such examples, the walls of FIG. 4 as their own heat pipes act as the heat sinks for the individual battery pack units 400.

In some examples, the shape of the heat pipe/vapor chambers could be a flat slab, for example, to be arranged on the top and/or bottom of the battery pack 200. The heat pipe may be formed as a tube, a cylinder, bent slab, or any other shape as described herein.

Turning back to FIG. 5, heat pipes work by being placed on one end into contact with a heat source 510, such as the battery cells described herein, and then the other end in contact with a heat sink 542 which may absorb or remove heat. In some examples, a heat sink may be an external environment, a radiator, a fan, a heat exchanger, or any other kind of heat sink as described alone or in combination.

Inside the heat pipe 500, the liquid and/or gas mixture 524 comes into contact with the walls of the heat pipe 522, when the heat source 532 raises in temperature, it heats the corresponding walls of the heat pipe 500 and thereby the liquid/gas mixture 524 inside the heat pipe walls 522. The liquid 524 may then vaporize, boil, and/or otherwise expand 550 away from the heat source end 532 and toward the heat sink end 542 where it gives its heat energy to the walls of the heat sink end 542 and cools. In some examples, this condenses the liquid and it then returns back 522 to the heat source end 532 to be heated again. In some examples, a wick structure 554 may be placed inside the chamber 524 to draw the condensed liquid back 552 to the heat source end 532 using capillary movement.

In some examples, rows of wick structures and/or capillary tubes 536 are embedded and/or line the walls 522 of the heat pipe 500. In such examples, the liquid and/or gas may move through the capillary structures when heated near the surface of the walls 522. The hot liquid may even turn to a gas phase in the walls 522 but in either case, expand away from the heat source 510 and toward the heat sink, thereby drawing heat away from the source 510. In some examples, capillary force brings more liquid to the heat source 510 while the boiled/heated gas proceeds to the cooler section of the heat pipe nearer the heat sink end 542. The heat continues to move along the pipe until it is expelled into the environment usually through a heat sink or other interaction with the environment such as the air as described herein.

In some examples, the heat pipe interior voids may include elongated bubble spaces inside the walls, and may be arrange in such a way that they are generally parallel to the ground when arranged in their corrugated shell and encapsulated. Similarly, the heat pipe/vapor chamber arrangements may be placed on the top and/or bottom of the overall battery pack 200. In such a way, the individual heat pipe/vapor chamber assemblies may allow for generated heat to be pulled away from the battery cells 202 that generate heat, toward another internal heat sink 210 as described herein.

In some examples, inside the walls 522 of the heat pipe/vapor chamber 500, a wick may be placed. Such a wick may be used to draw the liquid mixture back from the heat sink end 542 where the liquid may condense and back to the heat source end 532 to be vaporized again and absorb more heat.

As an extension of the corrugated concept, the heat management system could be further shaped to fill in the gaps 244 shown in FIG. 2 between the cells. In this application, any usage of heat pipes may refer to any shape possible by bending or extrusion of metal such as aluminum to improve contact with a cylindrical cell 202. Such heat management system can be planar, corrugated with a slight angle or even corrugated such that as much of the lateral area of the cell may be in contact with the heat management systems. The heat management system may also be curved and/or corrugated such as shown in FIG. 2. These curves could be used to better spread heat from the inner battery layers to an external heat sink. This curved portion may connect to the interior heat management system directly, with a thermal gap filler, or with thin aluminum sheet (for example, $\frac{1}{16}$ in, $\frac{1}{8}$ in) or any combination of the described items.

Heat Sink Fan/Peltier Examples

Figure 6:
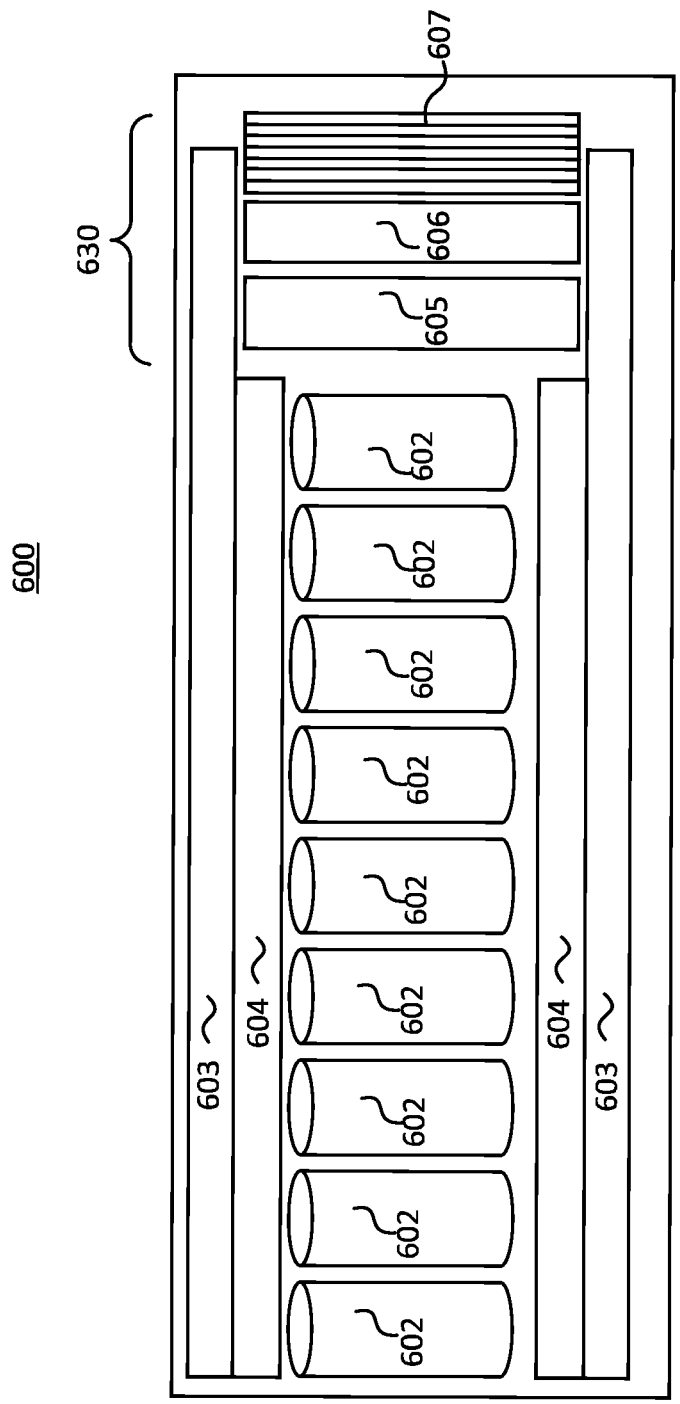
FIG. 6 is a diagram of an example fan/Peltier configuration used in embodiments disclosed herein.

FIG. 6 shows an example arrangement battery pack system 600 with an individualized heat sink fan/Peltier arrangement which may add additional thermal management as described in FIG. 2. In some examples, a fan 607 may be used in conjunction with a Peltier material to blow/pull cold air onto the heat pipe arrangements as described herein.

In use, when a voltage is applied to the Peltier device material, one side cools and the other side warms. In practice, the cool side may be arranged such that a fan may be configured to blow surrounding air toward the heat pipes to further remove heat from the battery pack 200. Such a Peltier material 606, in embodiments with such features, may use energy, which may be powered by the battery cells themselves, and the internal circuit system 230 may be used to manage such a system by turning it on and off depending on the status of temperature readings from the battery pack. Likewise, in embodiments with such features, such a fan may be powered by the battery cells and controlled by the circuit 230.

Such an example could include the combination fan with Peltier material at one end of a battery pack so as to be able to be removed, replaced, and/or maintained in a modular fashion.

In some examples, alternatively or additionally, the modular battery pack systems 200 may each include individualized thermal management such as the example shown in FIG. 6. As shown, within the battery pack 600 two main sections, the batteries cells 602, and the auxiliary thermal components in 630. Thermal management systems may be used to minimize the temperature on the cells 602 to keep the batteries at optimum working temperature. In some examples, the temperature goal is between approximately 5 and 40 C. These windows are merely examples, and could be programmed to be any temperature appropriate to the application.

In the example of FIG. 6, a thermal transport layer 603 may be configured to move heat away from the batteries cells 602. In such examples, thermal transport layer 603 may be any combination of heat pipe, vapor chamber, solid metal such as aluminum or copper or any combination thereof as described herein and in FIG. 5. In some examples, a circuit board 604 may be used as the direct contact with the battery cells 602. In some examples, such a circuit board 604 may be a traditional fiberglass printed circuit board, or it may also be aluminum or copper metal with an electrical insulation layer. In some examples, the circuit board may be about 60 µm thick to allow the printed circuits to operate. In some example embodiments, an optional layer of thermal grease between the thermal transport layer 603 and the circuit board 604 may improve the thermal contact between these sections. In some examples, additionally or alternatively, a combination of the thermal transport layer 603 and the circuit board 604 may be made with a single component that has the circuits directly printed onto the thermal transport layer.

In some examples, a circuit system 630 may be used to monitor and control aspects of heat removal from the module and maintaining the batteries at a pre-set temperature. In such examples, heat would flow during operation of the battery cells 602 from the batteries in along the thermal transport layer of 603. In such examples, heat from both portions of thermal transport layer 603 may be combined in a combiner unit 605. Example combiner unit 605 may be a thermally conductive material, for example, a metal such as copper or aluminum that has been machined to minimize air gaps between adjacent components.

Some examples, alternatively or additionally, may include a Peltier cooler 606 in the thermal management section 630. The Peltier effect is a semiconductor method where electrical energy creates a thermal gradient that can be used to lower adjacent component temperatures. Such examples with a Peltier cooler 606 may be arranged with the cooler side facing the combiner 605 and the hot side facing a heat sink 607. In some examples, additionally or alternatively, a combination of heat sinks 607 such as fins or heat exchangers with additional cooling fans may be utilized. In such examples, the combination of heat sinks 607 may be use for the removal of heat from the overall module 600.

In some examples, either additionally or alternatively, an arrangement of a fan and/or Peltier material may be used as an additional heat sink arrangement. In such examples, such an internal heat sink system 210 may be arranged at one end of the overall battery pack 200 and be in thermal communication with any of the various heat sink/heat pipe/vapor chamber 204 arrangements as shown in FIG. 2.

Internal Circuit Examples

Referring again back to FIG. 2, in some examples, a circuit 230 or more than one circuit may be included within the modular battery pack 200. In some examples, such a circuit 230 may be used for wiring the connection of the entire battery pack 200 to any given load. In such examples, the battery pack 200 may be moved, swapped, replaced, or otherwise utilized in a machine needing the power provided from the pack 200. The circuitry 230 may be used to connect the cells 202 to the system needing power (not shown) through a terminal which may contact the terminal of the system needing power.

In some examples, the circuit 230 may include component parts that may allow for load balancing functionality as described herein. In addition, in some examples, circuits 230 may include safety features within the modular battery pack such as temperature sensors connected to logic that may shut down the system at a predefined heat data reading.

FIG. 4 shows a schematic diagram of multiple battery packs 400 with their own individual battery cells 402 arranged with their circuits 430 all within a larger arrangement 401 of, in this example, six battery packs 400. As shown in FIG. 4, the circuits 430 are individualized for each modular battery pack 400 and may be arranged at one end of the battery pack 400. This arrangement may allow for access to circuit 430 terminals at one end of the modular battery pack 400 which is advantageous for servicing of the battery modules such as in a rackmount installation. In the example, the circuits 430 are not restricted to the portion of the battery pack shown in the figure, since the fusing circuits may be distributed in 402 and 430. The distinction of 430 is the location of wiring to access the internals of the battery pack, this includes communication ports, voltage ports and auxiliary ports such as thermistors. In the 430 portion of the battery pack there may also be thermal control components that are covered subsequently, In the example of FIG. 4, thermal management components such as heat sink components as described herein may be located at the modular level inside each battery pack 400 and/or at the system level in 440 shown at the ends, and bottom of the overall battery arrangement 401 and is discussed in more detail below. This may allow for thermal management on a macro overall scale 440 and a micro individual 400 scale. Additional circuits to control the modules may be employed in 440 which can include the functions of battery safety and thermal management. In some cases, the control circuits for the battery packs may be located in the macro level wall units 440 with the individual units 430 being only connections to the batteries. Any combination of placing circuitry in individual units 430 and/or larger scale units 440 may be utilized.

Thermal Management Examples

In some examples, the battery pack may also contain a battery thermal management system. The circuitry for the battery management system 230 may be configured to monitor the temperatures for the battery 202 strings and activate cooling mechanisms using a combination of circuits as described in FIG. 9.

Figure 9:
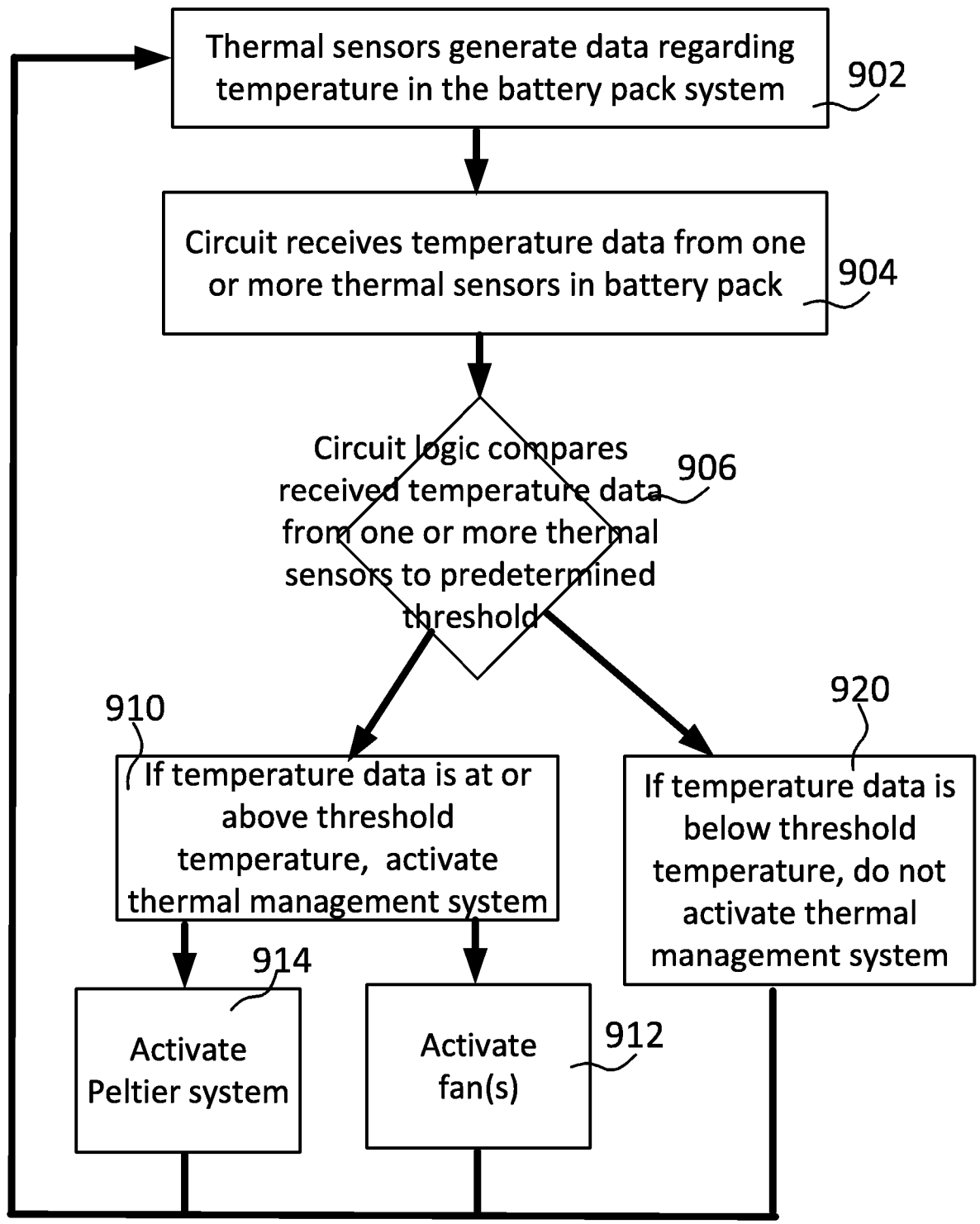
FIG. 9 is a flow chart of an example thermal management logic sequence used in embodiments disclosed herein.

In FIG. 9, the thermal sensors take readings of temperature in areas placed in the battery pack system 902. Next, as the thermal sensors are in communication with the circuit, the thermal data is sent to the circuit 904. Next, the circuit compares the thermal data to a predetermined threshold 906. Such a threshold could be at or approximately 104 degrees F. or between a range such as but not limited to between 104 and 108 degrees F. These windows are merely examples, and could be programmed to be any temperature appropriate to the application. Additional threshold criteria could be programmed into the circuit logic as well including a threshold of a certain number of thermal sensors reporting data that exceeds a temperature threshold. For example, if only one of five thermal sensors report temperatures that exceed the temperature threshold by one degree, the circuit may be programmed to determine that the overall criteria is not met. Such criteria may require three of the five thermal sensors to report data that exceeds the temperature thresholds for the determination to be positive. In another example, one reading of a very high temperature above a secondary threshold, may be enough for a positive determination. In another example, multiple readings that exceed the threshold by a few degrees is enough for a positive determination.

Any combination of temperature and/or number of sensor readings may be programmed into the circuit as logical thresholds to meet in order to make a positive determination.

If the circuit determines that whichever criteria is not met 920, the circuit does not activate any of the available thermal management systems.

If the circuit determines that whichever criteria is met and/or exceeded 910, the circuit may activate a thermal management system such as a Peltier system 914 as described herein and/or an auxiliary fan 912 or multiple fans.

In either case, the thermal management system is or is not activated, the thermal sensors will continue to generate thermal data 902 and send it to the circuit in order to maintain temperature within a range or window that may aid performance and minimize safety risk of thermal runaway and/or fire. In some examples, such a window may be between 248 and 302 degrees F. In some examples, the window may be at or approximately 248 degrees F. These windows are merely examples, and could be programmed to be any temperature appropriate to the application.

In some examples, once the thermal sensors report that a certain number of sensors sense temperatures that fall low enough and meet a predetermined threshold the circuit may send a command to the cooling systems to stop or disengage. Again, any combination of the above logic regarding number of sensors and/or temperature thresholds may be used.

Electrical Management Examples

In some examples, the battery pack may also contain a battery management system, and individual cell fusing. The circuitry for the battery management system 230 may be configured to monitor the voltages for the battery 202 strings and actively balance strings using a combination of circuits. The system may include a secondary passive system to bleed off current.

In some examples, either additionally or alternatively, battery packs 200 may include one or more circuits 230. Such circuits may be used to control the thermal managements systems, manage loads, load balancing, manage connections, temperature management, and or other example management functions.

In some examples, the circuit board itself 230 is not made of fiber, but of aluminum. In such examples, the aluminum circuit is able to conduct heat away from the heat source battery cells 202 as an additional cooling thermal management arrangement.

In some examples, the aluminum circuit board can be connected, directly by means of laser welding, indirectly by means of a thermal gap filler or simply pressed into the extruded aluminum heat pipes. This would further allow the heat to be removed from the cells through the electrical contact of the circuit board.

In some examples the aluminum circuit board could connect directly to the cells or contain a metal contact to the circuit board. This metal contact would be made out of a thermal and electrically conductive metal such as gold, copper, brass or aluminum. This metal would be compatible with the rest of the circuit to avoid corrosion over time. Gold is the most likely material to be used for this interface due to its lack of oxidation, ease of manufacturing, compatibility with soldering process and high electrical and thermal conductivities.

In some examples, monitoring the temperature of the battery pack may include sensors placed in any of various positions in the pack. In addition, the circuits may be configured as fuel gauging circuits to determine the remaining energy stored in a battery pack. In some examples, these fuel gauges may include readings at points along a charge and discharge curve. In some examples, circuits may be configured to monitor battery pack orientation. In some examples, orientation is sensed using a gyro, a ring laser gyro, a hall effect sensor, a magnetic sensor, a reflective sensor, an accelerometer, a flap, a ball, or any other orientation sensing device alone or in combination, placed within the battery pack itself.

In some examples, the circuits may be configured to add high voltage interlocks as needed. An example of interlocks would be a solid-state switch that is able to interrupt the circuit if a fault were detected. This has a slight advantage over a fuse since the system would be reversible without need for servicing after the fault has been cleared. The battery management system can be adapted to alternate battery chemistries and form factors by changes in the software to define the maximum and minimum charge and discharge voltages. The rates at which the batteries are allowed to charge and discharge would likewise have to be defined per each battery chemistry.

Balancing Examples

In some examples, the circuit 230 within the battery pack 200 may include circuitry for load balancing the battery cells 202. Such examples include monitoring the charge of each battery cell 202 within the overall system 200 by the logic circuit 230. By receiving data regarding the state of charge of each of the cells 202 within the overall system, the logic circuit 230 may be able to transfer charges from one cell to another, bleed charge as heat, or other balancing methods described herein, alone or in combination.

Balancing focuses on bringing strings of battery cells to the same state of charge. State of charge may refer to the percentage of charge stored in the cell relative to the maximum storage capacity of the cell. The analogy to a petrol system is that state of charge is the fuel gauge, it describes the amount of energy available in the string. When the battery is at its maximum charging voltage, it is at its full state of charge and conversely when the battery is fully discharged.

Passive Balancing may refer to a process where charge in full cells is either bled off as heat at the top of voltage or at the bottom of voltage for the system. This process has already been identified in the industry as wasteful since the generated heat is not useful, but this process is widespread since it is cost effective to implement. Another example includes active balancing systems, where the energy from the outliers e.g. battery cells and/or strings of battery cells with a higher charge than others in the battery pack, may be transferred to underperforming strings or strings with lower charge. For example, when charging a group of battery strings, active balancing can push charge from the highest stage of charge string to the string with the lowest state of charge. This may bring the system to a more even state of charge and may negate or lessen the need to bleed off energy from the high state of charge string to avoid overcharging it.

Maintenance Examples

In some example embodiments, various features of the battery pack 200 may be included in order to make maintenance of the battery pack capable, easier, or more efficient. In some examples, to connect the battery management circuit system 230 to the cells 202 in a way that is able to be serviced way, the batteries 202 may be connected using pins and or springs to the circuits 230 that are located on a printed circuit board (PCB). Thus, in such examples, a cover to the battery pack 200 may be placed over the top and/or bottom of the pack and the cover 290 may include a hard exoportion, 292, a foam layer 294 that is compressible but able to expand to push the contacts to the cells 202, and the pins 296 themselves that contact the battery cell 202 terminals. In some examples, the cover 290 may be removably secured to the main battery pack 200 by hook, latch, button, flap, screw thread, twist lock, friction fit, snap, and or other kind of removable security arrangement.

Some of the benefits to this design is that the complicated wiring and connections could be standardized by the PCB process and centralized in one board 230 and individual cells 202 may be replaced without the need to rewire the batteries as shown in FIG. 2

In maintenance examples, any cell 202 components on the boards that need replacement could be replaced with the usual solder process. In some examples, a battery pack with dead cells, could come in for service and have the dead cells replaced as well as the PCB. In this way, the PCB fuses could be replaced without delaying a vehicle operator undergoing routine car maintenance. The PCB could be a multilayer board (having at least 2 copper planes) with a plane that would contain some or all of the battery control circuits 830, shown schematically along with the battery connections in FIG. 8. These circuits would apply their functionality to the PCB and if they need to connect for temperature readings they could also use the same pin system.

Figure 8:
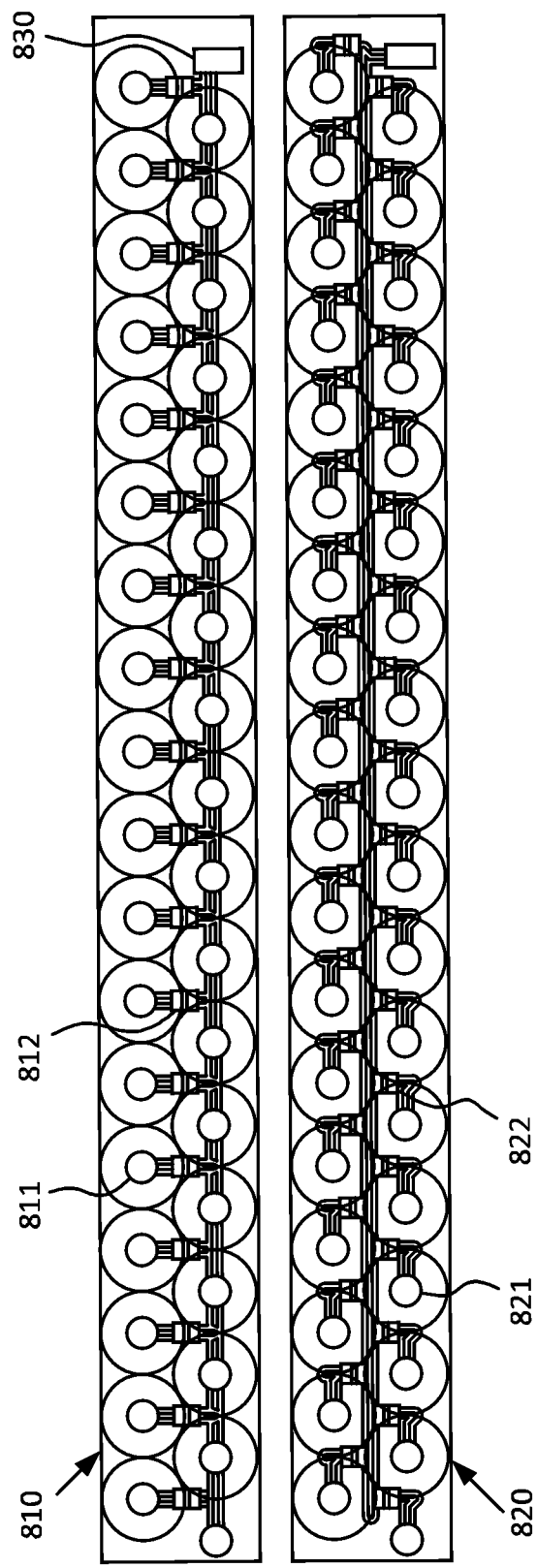
FIG. 8 is a top down depiction showing examples of the battery connection circuit boards of embodiments disclosed herein.

Additional benefits to the circuit board design is rapid manufacturing and assembly. Two types of boards are depicted showing single fusing 810 and double fusing 820. The connections to the batteries are the same gold press contact for both boards and depicted at 811 and 821 respectively. This pin is of comparable diameter to the flat top diameter of the batteries. Having the pin be slightly smaller allows for process variations in pin assembly to not affect the overall performance of the pin to battery connection. The example of FIG. 8 is not limited to the number of connections shown in the figure. The number of circuits could be as few as 2 and as many as a hundred per row in a large configuration. The number of cells would be scaled to the application electrical needs.

The battery fuses are shown at 812 and 822 and are ideally rated at 2X the maximum cell operating current. The maximum operating for typical 20700 and 21700 style batteries is between 8 and 12 amps with 10 amps being common. The fuse should be greater than 20 amps because fuses trip at lower threshold current when they become warm or as they age. In the event of an internal short in the battery pack, more than one battery's worth of current will be diverted toward the short due to the parallel connections in the battery pack. Each battery will provide around 10 amps, so a fuse with a rating of 20 to 40 amps will trip if there are more than 5 batteries in parallel and will trip faster as the number of batteries increases. The fuses need to have a maximum current interrupt rating greater than 10 amps multiplied by the number of batteries in parallel.

Usage Examples

As further detail for the energy storage systems, the system can be installed in a variety of locations. The energy storage system described in this application refers to systems installed to serve an entire residence, (house, apartment, condominium, mobile home), a subsection of a residence (living room, dining room, laundry room, kitchen, bathroom, den, bedroom, study) or individual appliances (Air conditioner unit, heater unit, refrigerator, computers, laptops, servers, televisions, home entertainment systems, lights). These energy storage units would be designed for their roles, with the larger systems needing to be directly connected to the building power service by a qualified personnel and the smaller systems being able to connect to existing power receptacles in the fashion of uninterruptable power supplies. The system may include surge protection and multiple outlets at voltages useful for the country of operation. These smaller systems may connect to larger systems by wired communication, wireless communication or act independently. The systems may communicate their status to a user by wired or wireless communication (emails, text messages, instant messages) or through a computer application.

Battery packs with features described herein may be employed in any of various power producing embodiments. Additionally or alternatively, uses may include employment in electric vehicles, such as but not limited to, aircraft, aerial drones, automobiles, scooters, bicycles, motorcycles, in marine environments such as boats, submarines, jet skis, jet boats, or any other kind of vehicle. Any vehicle that could utilize electric power in locomotion or any other kind of auxiliary use may utilize these systems. Employment for radios, navigation systems, environmental system such as heaters and air conditioning, air pumps, water pumps, flight control surface movement, wheel movement, power steering, or any other system that may utilize electricity could benefit from such systems.

The usage of the energy storage system to provide temporary power to the attached electronic devices. This can be used in the case of power loss (blackout, brownouts, surges) or for economic reasons such as peak shifting. Peak shifting is the practice of using battery energy during the day when energy is the most expensive to purchase and recharging at night with cheaper energy. Peak shifting requires good energy storage battery packs with enough capacity to keep the item powered during daylight hours. Peak shifting can be done at the device level, room level, home level, commercial property and even grid level.

An advantage of having high energy density batteries is the ability to replace an existing lead acid system with more energy for the same overall volume. This is accomplished by lithium ion batteries having at least 4× the volumetric energy density of lead acid batteries. An instance where this is particularly useful is introduced in the concept of an uninterruptable power supply (UPS) being combined with an energy storage system (ESS). This embodiment is envisioned to provide the UPS functionality to a data center's server computers while simultaneously allowing for peak shifting to reduce the center's electric bill. This would allow high energy use customers to have new functionality to their existing UPS systems while maintaining the system's original footprint. Since saving energy is a akin to the system paying for itself, if the battery life is long enough a system as described could pay for itself unlike any other UPS style system.

After describing the energy storage system, with its individually serviceable battery packs, the next stage is what to do with the cells when the system approaches end of life. For electric transportation, the batteries have to be of high quality and be relatively fresh in their lifecycle. For a stationary storage application, these constraints are less applicable. It is envisioned that the functioning cells from the electric transportation battery system, could be reused as a stationary system. This downcycling would alleviated the price concerns for stationary power and also put to use cells with lower capacities. This downcycling could be continued by moving to even less critical applications such as novelty items (light up trinkets). When the batteries finally are at end of life, as well as cells that had developed damage through use, they cells can be sent to a recycler. In this way, the cradle to grave of the cells has been addressed.

Example Computing Device

In some examples, the system may house the hardware electronics that run any number of various sensors and communications, as well as the sensors themselves, or portions of sensors. In some examples, the battery pack may house the sensors or portions of sensors. In some examples, the battery pack may include wireless communication systems. Example power supplies include but are not limited to a small coin cell battery. In some examples, alternatively or additionally, a WiFi module with an antenna and a processor and memory as described herein, may be used as hardware in the pack itself. In some embodiments, alternatively or additionally, the hardware may include a single integrated circuit containing a processor core, memory, and programmable input/output peripherals.

Figure 10:
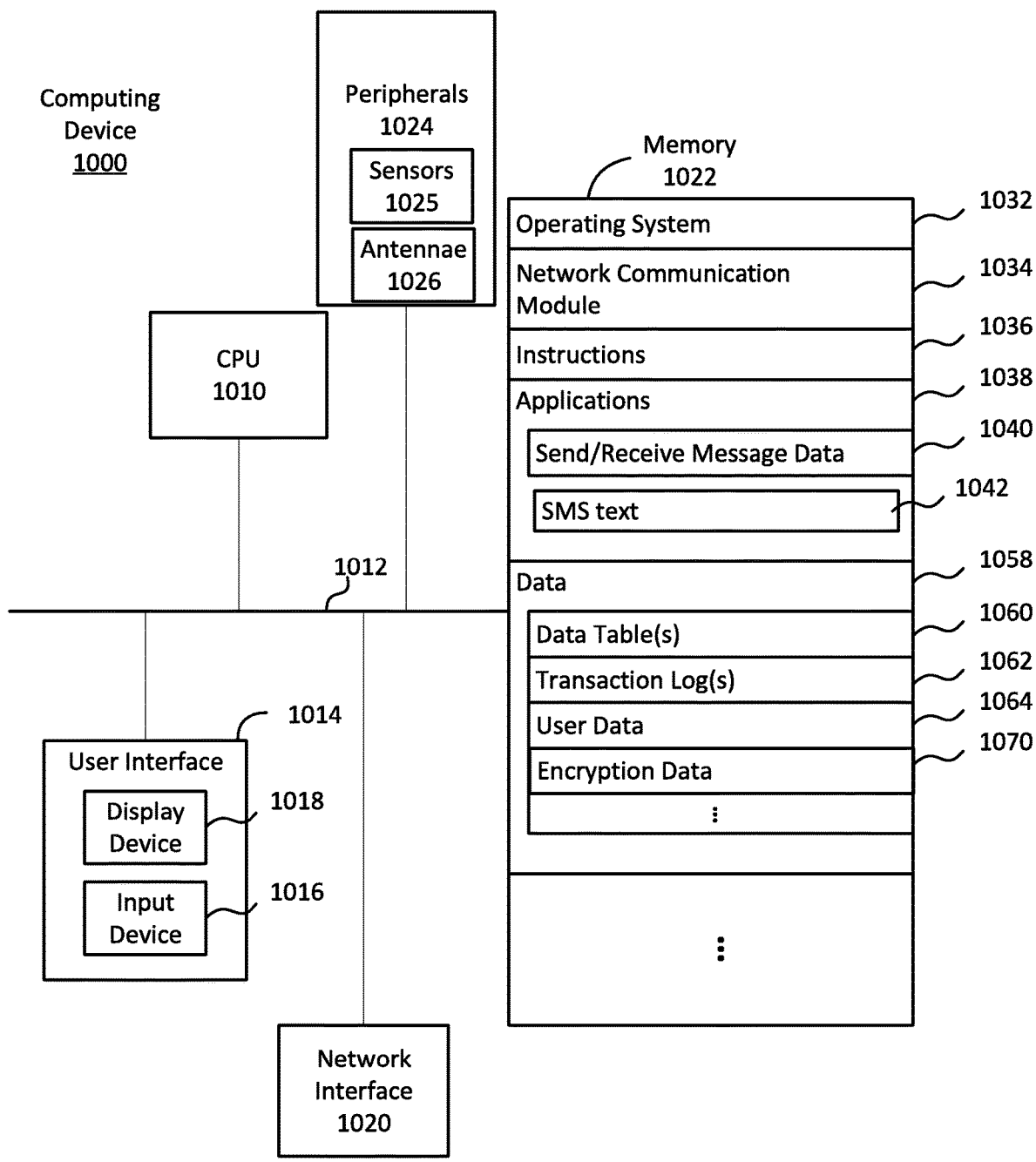
FIG. 10 is an example computer embodiment which may be used with any of the various embodiments disclosed herein.

FIG. 10 shows an example computing device 1000 that may be used in practicing certain example embodiments described herein. Such computing device 1000 may be the back end server systems use to interface with the network, receive and analyzed data, as well as generate test result GUIs. Such computer 1000 may be a mobile device used to create and send in data, as well as receive and cause display of GUIs representing data. In FIG. 10, the computing device could be a smartphone, a laptop, tablet computer, server computer, or any other kind of computing device. The example shows a processor CPU 1010 which could be any number of processors in communication via a bus 1012 or other communication with a user interface 1014. The user interface 1014 could include any number of display devices 1018 such as a screen. The user interface also includes an input such as a touchscreen, keyboard, mouse, pointer, buttons or other input devices. Also included is a network interface 1020 which may be used to interface with any wireless or wired network in order to transmit and receive data. Such an interface may allow for a smartphone, for example, to interface a cellular network and/or WiFi network and thereby the Internet. The example computing device 1000 also shows peripherals 1024 which could include any number of other additional features such as but not limited to sensors 1025, and/or antennae 1026 for communicating wirelessly such as over cellular, WiFi, NFC, Bluetooth, infrared, or any combination of these or other wireless communications. The computing device 1000 also includes a memory 1022 which includes any number of operations executable by the processor 1010. The memory in FIG. 10 shows an operating system 1032, network communication module 1034, instructions for other tasks 1038 and applications 1038 such as send/receive message data 1040 and/or SMS text message applications 1042. Also included in the example is for data storage 1058. Such data storage may include data tables 1060, transaction logs 1062, user data 1064 and/or encryption data 1070.

Conclusion

As disclosed herein, features consistent with the present inventions may be implemented by computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks by one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Etc.

What is claimed is:

1. A method of thermally managing a modular battery system, comprising:
   receiving, at a logic circuit in a first end of a modular battery pack housing, thermal data of modular battery cells from heat sensors in communication with the logic circuit;
   determining, at the logic circuit, if the thermal data of modular battery cells exceeds a predetermined temperature threshold, and if the thermal data exceeds the predetermined temperature threshold, sending, by the logic circuit, commands to energize a Peltier heat sink configured at a second end of the modular battery pack housing,
   wherein the Peltier heat sink may be individually removed or replaced within the modular battery pack housing,
   wherein the Peltier heat sink is in communication with an enclosed corrugated heat pipe arranged between two rows of battery cells within the housing in thermal contact with fused aluminum circuit boards that press connect each of the battery cells in the row within the housing.

2. The method of claim 1 wherein the heat sensors are arranged on corrugated heat sink vapor chambers configured between rows of battery cells within the battery system.

3. The method of claim 1 further comprising, sending, by the logic circuit, commands to energize a fan configured at the second end of the battery pack housing, if the logic circuit determines that the thermal data exceeds the predetermined threshold.

4. The method of claim 1 wherein the determining step includes data regarding the number of heat sensors of which the corresponding data exceeds the predetermined threshold.

5. The method of claim 1 wherein the battery pack system is in thermal communication with a multi-pack wall which includes multiple battery pack systems.

6. The method of claim 1 further comprising, monitoring, at the logic circuit, a charge of each battery cell within the battery pack system.

7. The method of claim 6 further comprising, active balancing, by the logic circuit, by commanding a higher charged cell in the battery pack system to discharge into a lower charged cell in the battery pack system.

* * * * *